US009188052B2

(12) United States Patent
Tajima

(10) Patent No.: US 9,188,052 B2
(45) Date of Patent: Nov. 17, 2015

(54) VEHICLE FRONT PORTION STRUCTURE

(75) Inventor: Masao Tajima, Toyota (JP)

(73) Assignee: TOYOTA JIDOSHA KABUSHIKI KAISHA, Toyota-Shi (JP)

(*) Notice: Subject to any disclaimer, the term of this patent is extended or adjusted under 35 U.S.C. 154(b) by 0 days.

(21) Appl. No.: 14/350,605

(22) PCT Filed: Oct. 12, 2011

(86) PCT No.: PCT/JP2011/073442
§ 371 (c)(1),
(2), (4) Date: Apr. 9, 2014

(87) PCT Pub. No.: WO2013/054406
PCT Pub. Date: Apr. 18, 2013

(65) Prior Publication Data
US 2014/0251241 A1    Sep. 11, 2014

(51) Int. Cl.
F01P 5/02       (2006.01)
B60K 11/04      (2006.01)
F01P 11/10      (2006.01)
F01P 5/06       (2006.01)
B60K 11/08      (2006.01)
B62D 35/02      (2006.01)
(Continued)

(52) U.S. Cl.
CPC . *F01P 5/02* (2013.01); *B60K 11/04* (2013.01); *B60K 11/08* (2013.01); *B60K 13/04* (2013.01); *B62D 35/02* (2013.01); *F01N 3/055* (2013.01); *F01P 5/06* (2013.01); *F01P 11/10* (2013.01); *F01N 2260/022* (2013.01); *F01N 2260/20* (2013.01); *Y02T 10/20* (2013.01)

(58) Field of Classification Search
CPC ............. F01P 5/02; F01P 5/06; F01P 5/08; B60K 11/02; B60K 11/04; B60K 11/06; B60K 11/08; B60K 11/085
USPC .......... 123/41.56, 41.58, 41.63, 41.65, 41.66; 180/68.1–68.6
See application file for complete search history.

(56) References Cited

U.S. PATENT DOCUMENTS 5,490,572 A * 2/1996 Tajiri et al. .................. 180/65.1
5,526,872 A * 6/1996 Gielda et al. .................... 165/41
5,626,185 A * 5/1997 Gielda et al. .................... 165/41
(Continued)

FOREIGN PATENT DOCUMENTS

DE    4243593 A1 * 7/1993
JP    H05-301528 A   11/1993
(Continued)

*Primary Examiner* — Lindsay Low
*Assistant Examiner* — Grant Moubry
(74) *Attorney, Agent, or Firm* — Kenyon & Kenyon LLP

(57) ABSTRACT

A vehicle front portion structure is obtained that can efficiently lead cooling wind to a heat exchanger. A vehicle front portion structure has: a heat exchanger; a flow path member that forms a discharging flow path that discharges airflow, that has passed through an air-side flow path of the heat exchanger, to a vehicle exterior from a downwardly-directed opening portion at a rear side with respect to the heat exchanger; and an airflow promoting structure that forms a contracted flow path that gradually becomes more narrow from a front end side toward a rear end side, and that, at the front end side, increases a speed of traveling wind that has flowed-in from beneath a vehicle floor, and that causes the traveling wind to flow-out from between the heat exchanger and the opening portion at the discharging flow path.

4 Claims, 4 Drawing Sheets

(51) Int. Cl.
*F01N 3/05* (2006.01)
*B60K 13/04* (2006.01)

(56) References Cited

U.S. PATENT DOCUMENTS

| | | | |
|---|---|---|---|
| 6,302,228 B1* | 10/2001 | Cottereau et al. | 180/68.1 |
| 6,390,217 B1* | 5/2002 | O'Brien et al. | 180/68.6 |
| 6,543,525 B2* | 4/2003 | Kalbacher | 165/140 |
| 6,622,807 B2* | 9/2003 | Preiss | 180/68.1 |
| 7,290,630 B2* | 11/2007 | Maeda et al. | 180/68.4 |
| 7,497,287 B2* | 3/2009 | Kunikata et al. | 180/68.1 |
| 8,672,067 B2* | 3/2014 | Ajisaka | 180/65.21 |
| 2003/0201133 A1 | 10/2003 | Kobayashi et al. | |
| 2011/0284298 A1 | 11/2011 | Ajisaka | |
| 2013/0133963 A1 | 5/2013 | Ajisaka | |

FOREIGN PATENT DOCUMENTS

| | | |
|---|---|---|
| JP | 2003-326981 A | 11/2003 |
| JP | 2007-056717 A | 3/2007 |
| JP | 2008-019741 A | 1/2008 |
| JP | 2010-036712 A | 2/2010 |
| JP | 2012-156010 A | 8/2012 |
| JP | 5131410 B2 | 1/2013 |
| WO | 2010097890 A1 | 9/2010 |

* cited by examiner

US 9,188,052 B2

VEHICLE FRONT PORTION STRUCTURE

CROSS-REFERENCE TO RELATED APPLICATIONS

This is a national phase application based on the PCT International Patent Application No. PCT/JP2011/073442 filed on Oct. 12, 2011, the entire contents of which are incorporated herein by reference.

TECHNICAL FIELD

The present invention relates to a vehicle front portion structure.

BACKGROUND ART

There are known cooling modules in which an axial fan is disposed at the vehicle rear side of a radiator and a condenser (see, for example, Japanese Patent Application Laid-Open (JP-A) No. 2007-056717, JP-A No. 2008-019741).

DISCLOSURE OF INVENTION

Technical Problem

However, there is room for improvement with regard to efficiently leading cooling wind to a radiator or a condenser.

An object of the present invention is to provide a vehicle front portion structure that can efficiently lead cooling wind to a heat exchanger.

Solution to Problem

A vehicle front portion structure relating to a first aspect of the present invention comprises: a heat exchanger; a flow path member that forms a discharging flow path that discharges airflow, that has passed through an air-side flow path of the heat exchanger, to a vehicle exterior from an opening portion that is directed toward a vehicle lower side at a vehicle rear side with respect to the heat exchanger; and an airflow promoting structure that forms a contracted flow path that gradually becomes more narrow from a front end side toward a rear end side, and that, at the front end side, increases a speed of traveling wind that has flowed-in from beneath a vehicle floor, and that causes the traveling wind to flow-out from between the heat exchanger and the opening portion at the discharging flow path.

In accordance with the above-described aspect, the vehicle traveling wind flows into the contracted flow path of the airflow promoting structure, and is made to flow-out from this contracted flow path portion to an intermediate portion of the discharging flow path. Accompanying the passage of the traveling wind through the contracted flow path, the flow velocity of the traveling wind is increased. Therefore, negative pressure is generated (negative pressure becomes greater) at the periphery of the flow-out region of traveling wind from the contracted flow path at the discharging flow path, i.e., at the rear of the heat exchanger. As compared with a structure that is not provided with the airflow promoting structure, cooling wind that passes through the air-side flow path of the heat exchanger is generated or promoted.

In this way, in the vehicle front portion structure of the above-described aspect, cooling wind can be efficiently led to the heat exchanger.

The above-described aspect may be structured such that the airflow promoting structure is structured by members including an exhaust system part that is disposed at a vehicle front side with respect to the opening portion of the discharging flow path, and a heat-insulating member that covers at least a portion of the exhaust system part from the vehicle front side and from above such that at least a portion of the contracted flow path is formed.

In accordance with the above-described aspect, the contracted flow path portion is structured by utilizing a part that is necessary in terms of the functions of the vehicle. Further, cooling of the exhaust system part, i.e., the exhaust, by traveling wind is possible.

The above-described aspect may be structured such that the exhaust system part is structured to include a muffler that is disposed so as to be long in a vehicle transverse direction and that is flat in a vehicle vertical direction.

In accordance with the above-described aspect, the airflow contacts the wide surface of the flat muffler, and the effect of cooling the exhaust is great.

The above-described aspect may be structured so as to comprise a fan that is provided at the vehicle rear side with respect to the heat exchanger within the discharging flow path and at a vehicle front side with respect to a portion where the contracted flow path portion causes air to flow-out, and, due to an operation of the fan, airflow that passes through the heat exchanger is generated, and the operation of the fan is prohibited when a vehicle speed exceeds a predetermined value.

In accordance with the above-described aspect, in a state in which the vehicle speed exceeds a predetermined value and the fan is not operated, the amount of cooling wind that passes through the air-side flow path of the heat exchanger can be ensured.

Advantageous Effects of Invention

As described above, the vehicle front portion structure relating to the present invention exhibits the excellent effect of being able to efficiently lead cooling wind to a heat exchanger.

DESCRIPTION OF EMBODIMENTS

Figure 1:
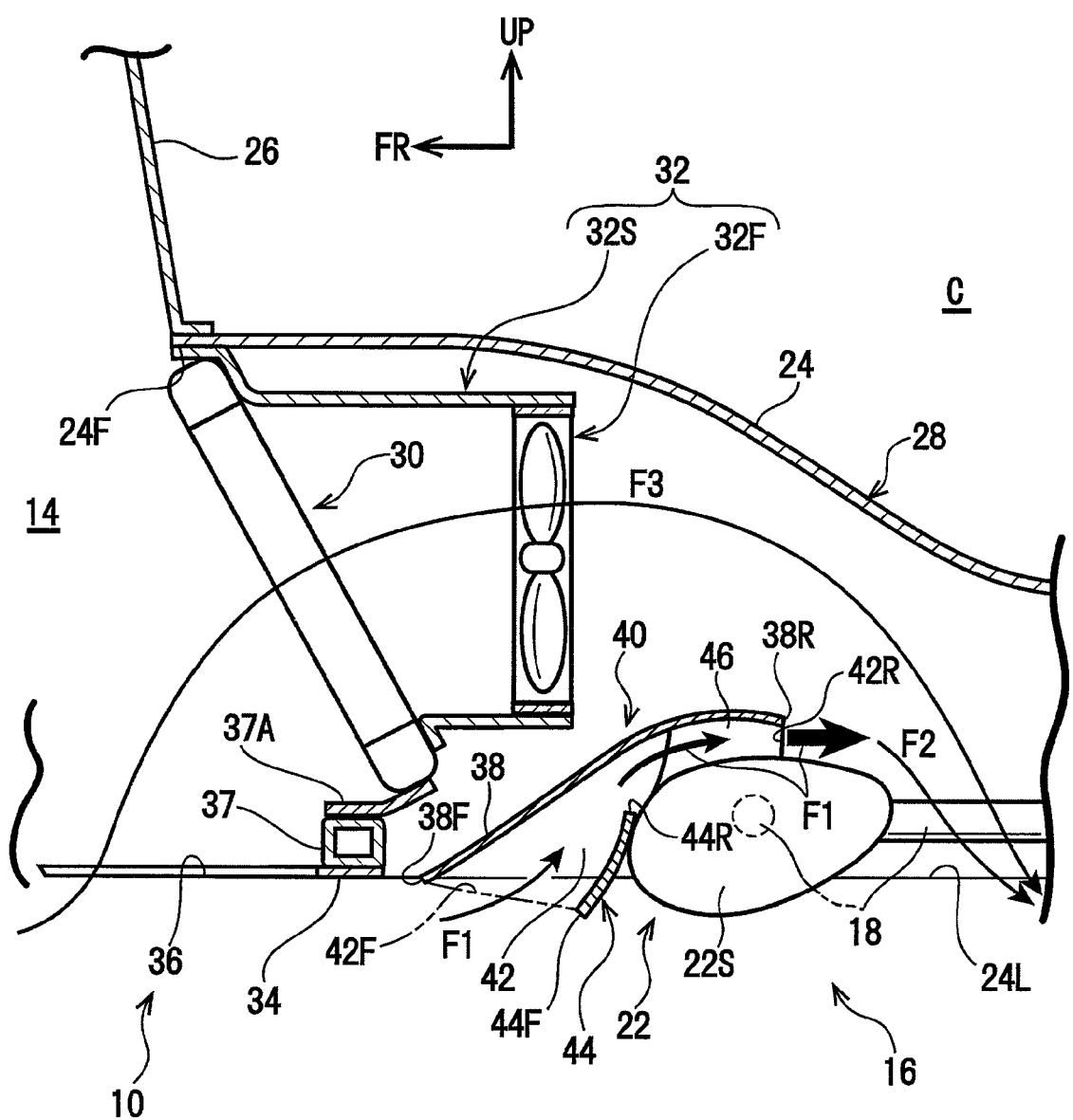
FIG. 1 is a side sectional view showing, in an enlarged manner, main portions of a vehicle front portion structure relating to an embodiment of the present invention.

A vehicle front portion structure 10 relating to an embodiment of the present invention is described on the basis of FIG. 1 through FIG. 4. The schematic structure of a vehicle V to which the vehicle front portion structure 10 is applied, a cooling unit structure, an airflow promoting structure that promotes introduction of traveling wind into a cooling unit, and the operation of the present embodiment are described in that order. Note that arrow FR that is shown appropriately in the drawings indicates the forward direction in the vehicle longitudinal direction, arrow UP indicates the upward direction in the vehicle vertical direction, and arrow W indicates the vehicle transverse direction, respectively. In the following description, when longitudinal and vertical directions are used, they mean the longitudinal of the vehicle longitudinal direction and the vertical of the vehicle vertical direction unless otherwise stated.

(Schematic Structure of Vehicle)

Figure 2:
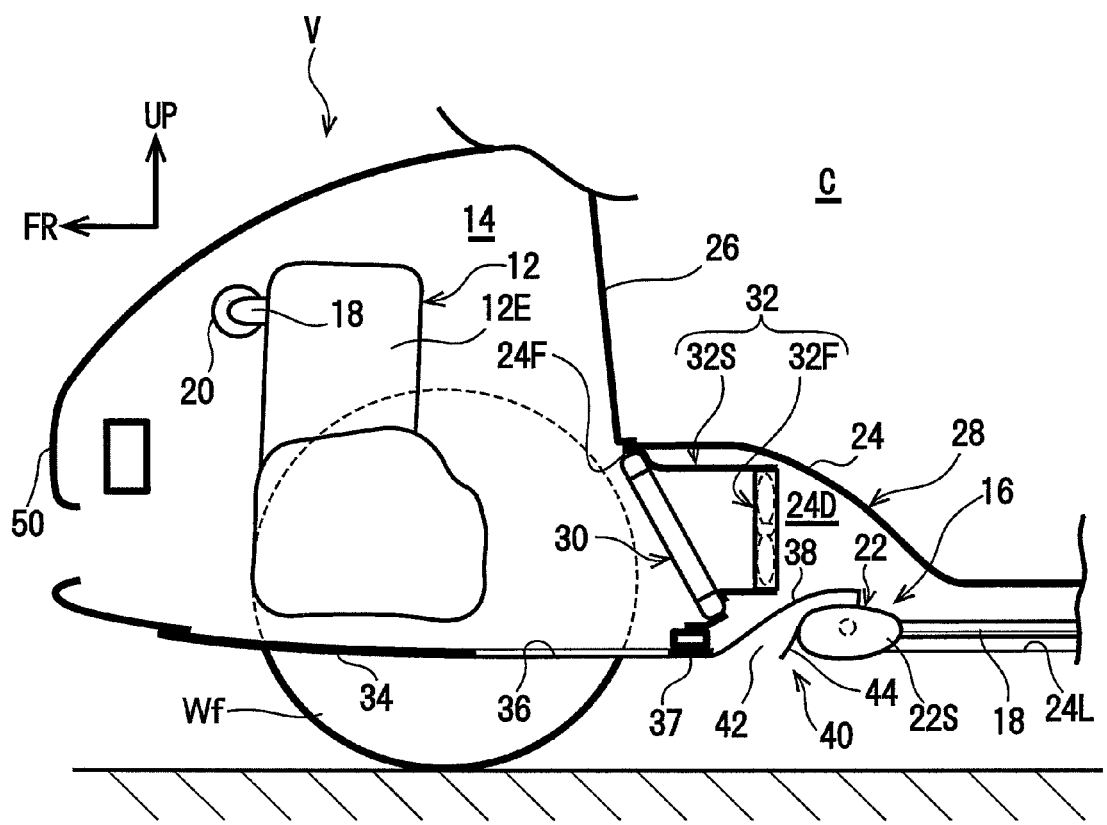
FIG. 2 is a side sectional view that schematically shows the vehicle front portion structure relating to the embodiment of the present invention.
Figure 3:
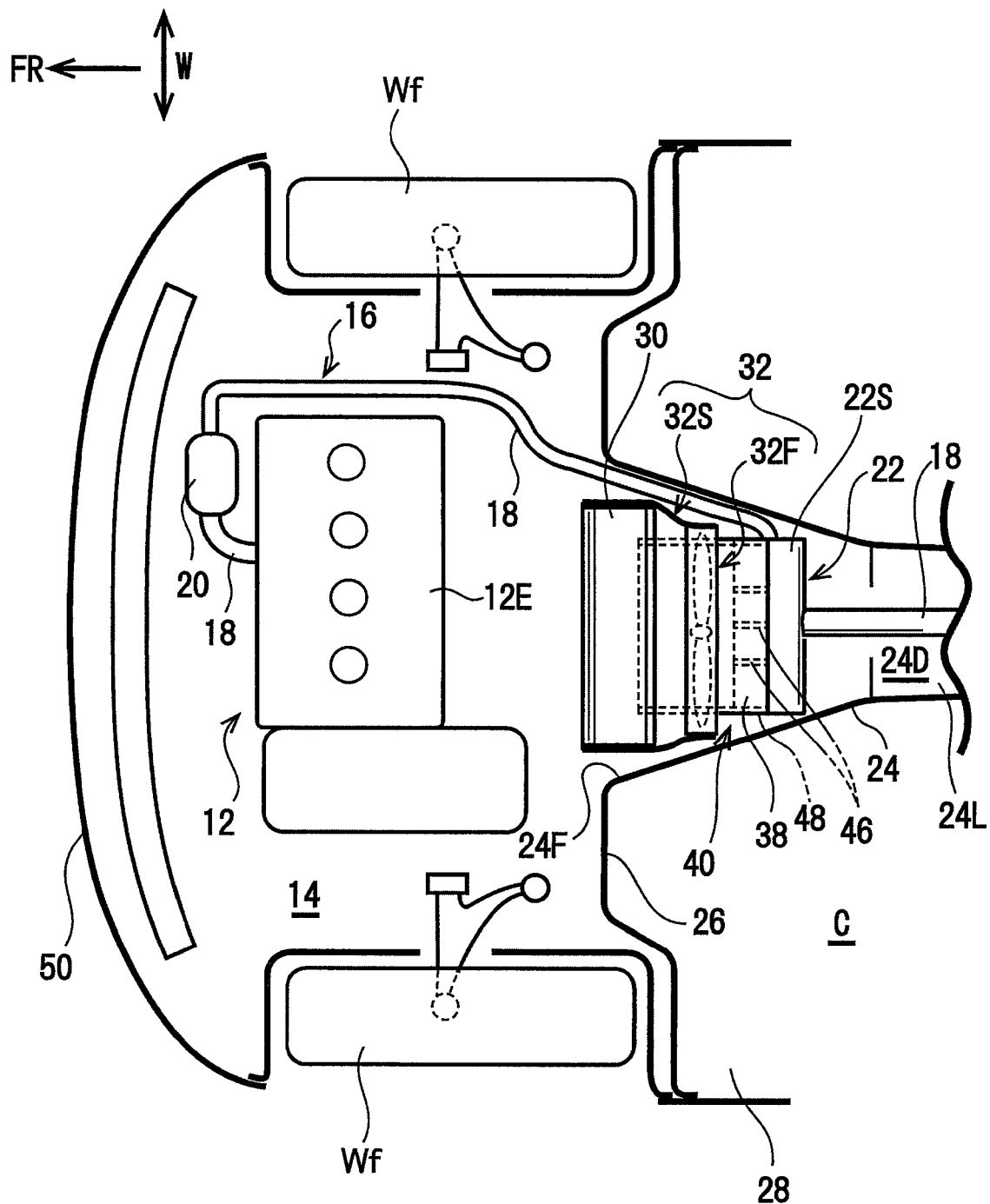
FIG. 3 is a plan view that schematically shows the vehicle front portion structure relating to the embodiment of the present invention.

The front portion of the vehicle V to which the vehicle front portion structure 10 is applied is shown in a schematic side view in FIG. 2, and the front portion of the vehicle V is shown in a schematic plan view in FIG. 3. As shown in these drawings, a power unit chamber 14, in which a power unit 12 is disposed, is disposed at the front end side of the vehicle V. As the drive source for driving front wheels Wf that serve as wheels, the power unit 12 in this embodiment is structured to include an engine 12E that is an internal combustion engine. The power unit 12 may be structured as a hybrid type that includes, in addition to the engine 12E, an electric motor for driving the front wheels Wf.

Further, as shown in FIG. 3, the vehicle V has an exhaust system 16 for discharging, to the vehicle exterior, exhaust of the engine 12E that structures the power unit 12. The exhaust system 16 is structured to include an exhaust pipe 18 whose one end is connected to the exhaust port of the engine, a catalytic converter 20 and a muffler device 22. The catalytic converter 20 and the muffler device 22 are provided in series at the exhaust pipe 18, and may be interpreted as structuring portions of the exhaust pipe 18.

In this embodiment, the exhaust pipe 18 is connected to the front side of the engine 12E, and passes so as to circle around the side of the engine 12E, and is led to the interior of a floor tunnel 24. Although not illustrated, the rear end of the exhaust pipe 18, i.e., the end that is open to the atmosphere, reaches a vicinity of the rear end of the vehicle V. The catalytic converter 20 is provided at the exhaust pipe 18 (between the exhaust pipe 18 and the engine 12E), and is disposed at the front side with respect to the engine 12E.

The muffler device 22 is structured such that the main portions thereof are a sub-muffler 22S at which a portion thereof or the entirety thereof is disposed within the floor tunnel 24, and a main muffler that is not illustrated and that is provided at the rear (the exhaust downstream side) with respect to this sub-muffler 22S. The concrete shape and placement of the sub-muffler 22S are described later together with the main portions of the present embodiment. In this embodiment, the sub-muffler 22S corresponds to the exhaust system part and the muffler of the present invention.

(Cooling Unit Structure)

The power unit chamber 14, in which is disposed the power unit 12 that is structured to include the engine 12E that is an internal combustion engine as described above, can be interpreted as a so-called engine room. As shown in FIG. 2 and FIG. 3, the rear end portion in the vehicle longitudinal direction of the power unit chamber 14 is prescribed by a dash panel 26 that separates the power unit chamber 14 and a vehicle cabin C. The dash panel 26 is joined to the front end portion in the vehicle longitudinal direction of a floor panel 28.

The aforementioned floor tunnel 24, that is formed in a "U" shape that opens downward as seen in a front sectional view, is foamed at the central portion in the vehicle transverse direction at the floor panel 28. The floor tunnel 24 opens toward the power unit chamber 14 at the front end thereof (the dash panel 26), and accommodates, at the interior thereof, the portion of the exhaust pipe 18 from the intermediate portion to the end portion, and the sub-muffler 22S that structures a portion of the muffler device 22, and the like.

Further, at the vehicle V to which the vehicle front portion structure 10 is applied, a cooling unit 30 that is a heat exchanger is disposed so as to close an opening end 24F at the front side of the floor tunnel 24 as seen from the interior of the power unit chamber 14. Accordingly, in this embodiment, the cooling unit 30 is disposed at the rear side with respect to the power unit 12. Further, the cooling unit 30 in this embodiment is set in a forwardly-inclined posture such that the upper end side thereof is positioned further toward the front than the lower end side. This cooling unit 30 is structured to include a radiator that is a heat exchanger that circulates cooling water between the radiator and the engine 12E of the power unit 12 and cools this engine 12E. In this embodiment, the cooling unit 30 is structured to also include a condenser (condenser) that is a heat exchanger that structures (the refrigeration cycle of) an unillustrated air conditioner.

Further, as shown in FIG. 1 as well, a fan unit 32 that includes a fan 32F is provided at the rear side of the cooling unit 30. In this embodiment, the fan unit 32 has a fan shroud 32S that covers the region between the fan 32F and the cooling unit 30. Via this fan shroud 32S, the fan unit 32 is made into a module together with the cooling unit 30. Due to operation of this fan unit 32, cooling wind, that carries out heat exchange with engine cooling water and an air conditioner coolant, passes-through the cooling unit 30 from the front surface side thereof toward the rear surface side.

The cooling wind, after having carried out heat exchange with the engine cooling water and the air conditioner coolant, passes through an exhaust duct 24D that serves as an exhaust flow path and that is space at the interior of the floor tunnel 24, and passes-through a downwardly-directed opening portion 24L of the floor tunnel 24, and is discharged-out to beneath the floor. Although described in detail later, there is a structure in which the cooling wind that has passed-through the exhaust duct 24D is discharged to the exterior of the vehicle from the rear portion of an airflow promoting structure 40 (the sub-muffler 22S) at the downwardly-directed opening portion 24L of the floor tunnel 24. In other words, the floor tunnel 24 (the floor panel 28) corresponds to the flow path member that structures the exhaust flow path in the present invention. Further, the rear portion of the airflow promoting structure 40 at the downwardly-directed opening portion 24L of the floor tunnel 24 corresponds to the opening portion that is directed toward the vehicle lower side at the exhaust flow path.

On the other hand, the air, that is introduced-in from an air intake port 36 that is formed in an under cover 34, is led to the cooling unit 30 as cooling wind that carries out heat exchange with the engine cooling water of the radiator and the air conditioner coolant of the condenser. The under cover 34 is a plate-shaped member that is made of resin and that covers the power unit chamber 14 from beneath. The air intake port 36 is disposed directly in front of the cooling unit 30 at the under cover 34.

More concretely, the positions, in the longitudinal direction, of the lower end of the cooling unit 30 and the rear end of the air intake port 36 substantially coincide. Further, the position of the rear end of the under cover 34 substantially coincides with the position of the lower end of the dash panel 26 (the front end of the floor panel 28), and there is a structure in which the downwardly-directed opening portion 24L of the floor tunnel 24 is not covered. In this embodiment, as shown in FIG. 1 and FIG. 2, the rear end of the under cover 34 is joined to a cross member 37 that forms a vehicle body skeleton. Note that, via a bracket 37A, the cross member 37 also supports the lower end of the cooling unit 30.

The main flow of the cooling wind, that is introduced-in from the air intake port 36, is either of traveling wind of the vehicle V, and airflow that is generated due to operation of the fan unit 32 (hereinafter called forced cooling wind). Namely, the heat exchange at the cooling unit 30 is carried out due to traveling wind of the vehicle V, or the forced cooling wind generated by the fan unit 32, flowing through the air-side flow path of the cooling unit 30. This embodiment is structured such that, when it is judged by an unillustrated cooling ECU that the vehicle speed of the vehicle V is less than or equal to a predetermined vehicle speed (e.g., 80 km/h) and the cooling water temperature is greater than or equal to a predetermined temperature, the fan unit 32 is operated by this cooling ECU. There is a structure in which, when the fan unit 32 is operated, air beneath the floor of the vehicle V passes through the air intake port 36 and is led to the cooling unit 30 as forced cooling wind due to the suction force of the fan unit 32.

On the other hand, when it is judged that the vehicle speed of the vehicle V exceeds the predetermined vehicle speed, the cooling ECU stops the fan unit 32 or maintains the fan unit 32 in the stopped state. Due thereto, there is a structure in which, when the vehicle speed of the vehicle V exceeds the predetermined vehicle speed, traveling wind passes through the air intake port 36 and is led to the cooling unit 30.

(Airflow Promoting Structure)

At the vehicle front portion structure 10, the airflow promoting (assisting) structure 40 for promoting passage of traveling wind through the cooling unit 30 is structured to include the sub-muffler 22S that structures the muffler device 22, and a heat insulator 38 that serves as a heat-insulating (heat-shielding) member. Accordingly, in this embodiment, the sub-muffler 22S corresponds to the exhaust system part and the muffler in the present invention.

Concrete description is given hereinafter.

Figure 4:
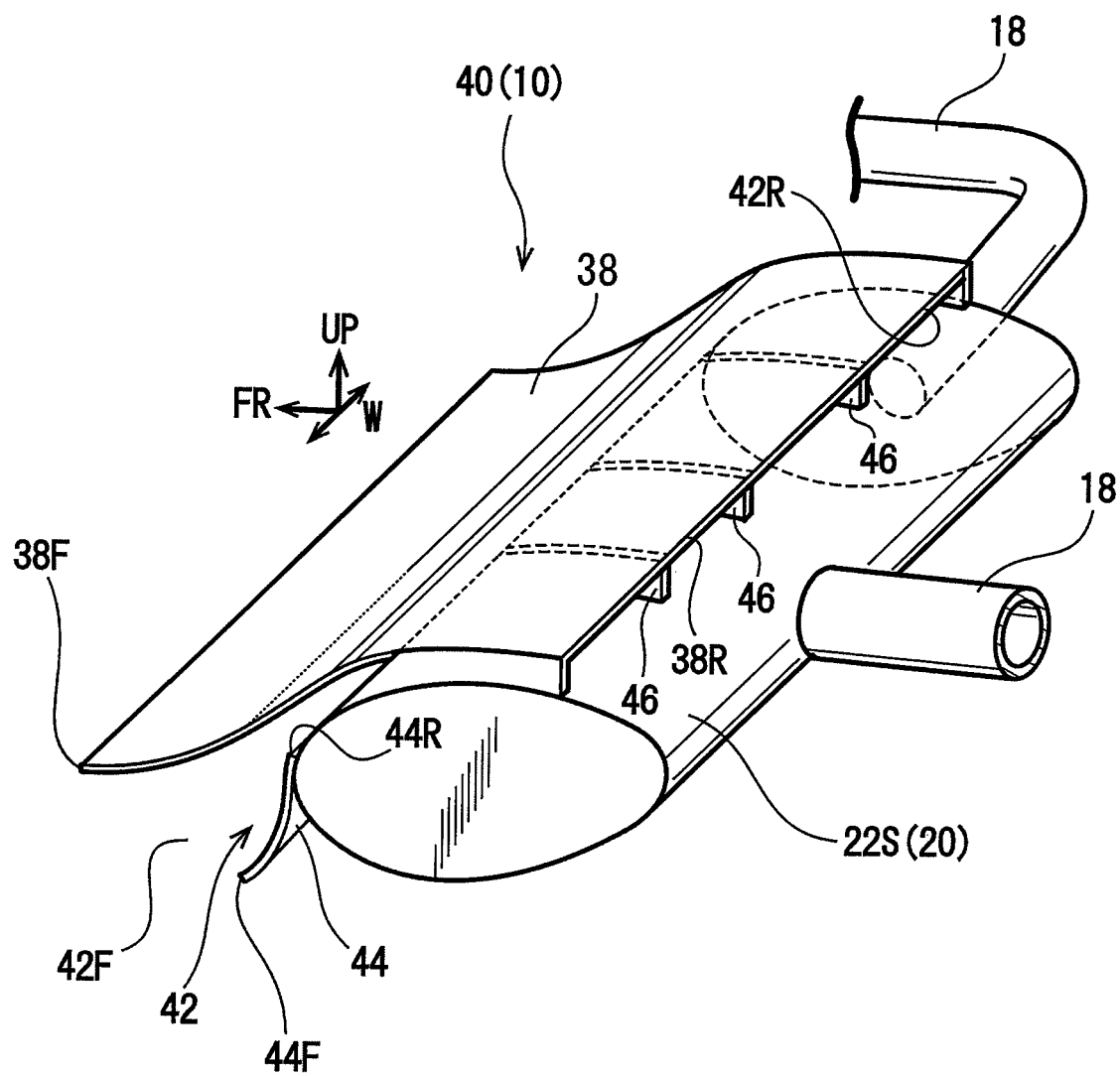
FIG. 4 is a perspective view showing a sub-muffler and an insulator that structure the vehicle front portion structure relating to the embodiment of the present invention.

As shown in FIG. 3 and FIG. 4, the sub-muffler 22S is formed in a rectangular shape that is long in the vehicle transverse direction as seen in plan view, and is formed in an oval shape in which the vertical direction substantially coincides with the short diameter direction as seen in side view. Namely, the sub-muffler 22S is a so-called flat muffler that is flat in the vertical direction. As shown in FIG. 1, this sub-muffler 22S is disposed substantially along the plane of opening (the horizontal plane) of the downwardly-directed opening portion 24L of the floor tunnel 24, at the rear with respect to the fan unit 32. A portion of the lower end side of the sub-muffler 22S projects-out downward from the downwardly-directed opening portion 24L of the floor tunnel 24. Note that the exhaust pipe 18 at the power unit 12 (upstream) side is connected to a vehicle transverse direction end surface of the sub-muffler 22S, and the exhaust pipe 18 at the main muffler (downstream) side extends toward the rear from the vehicle transverse direction central portion of the sub-muffler 22S.

The heat insulator 38 is a plate-shaped member that is disposed between the sub-muffler 22S, and the cooling unit 30 and the fan unit 32. Namely, the fan unit 32 covers the sub-muffler 22S in a non-contacting manner, and is disposed so as to block the passage of movement of heat from the sub-muffler 22S toward the cooling unit 30 and the fan unit 32. In this embodiment, a front end 38F of the heat insulator 38 juts-out forwardly from the sub-muffler 22S, and reaches a vicinity of the lower end of the cooling unit 30 (the cross member 37) and a vicinity of the plane of opening of the downwardly-directed opening portion 24L of the floor tunnel 24. A rear end 38R of the heat insulator 38 reaches the substantially central portion in the longitudinal direction of the sub-muffler 22S.

A contracted flow path (throttled flow path) 42 is formed between the above-described sub-muffler 22S and heat insulator 38. Concretely, as shown in FIG. 1, the contracted flow path 42 is a shape such that the flow path height thereof gradually becomes shorter (the flow path cross-sectional area thereof gradually becomes smaller) from the vehicle front side toward the rear side as seen in a side sectional view. Further, the vehicle front portion structure 10 has, in front of the sub-muffler 22S, a lower plate 44 that forms the lower wall of the contracted flow path 42. Namely, the contracted flow path 42 in this embodiment is formed by the sub-muffler 22S and the lower plate 44, and the heat insulator 38, on the whole as a flow path whose flow path height gradually becomes shorter from the vehicle front side toward the rear side.

The lower plate 44 juts-out, from the downwardly-directed opening portion 24L of the floor tunnel 24, further downward than the under cover 34 and the plane of opening of the downwardly-directed opening portion 24L of the floor tunnel 24, in a posture in which a front end 44F is positioned further toward the lower side than a rear end 44R. Due thereto, the lower plate 44 is structured to function also as an aerodynamic member that guides traveling wind to the interior of the contracted flow path 42. The vertical position of the front end 44F of the lower plate 44 substantially coincides with the vertical position of the lowest portion of the sub-muffler 22S. Moreover, the front end 44F of the lower plate 44 is disposed further toward the rear than the front end 38F of the heat insulator 38. Due to the above, an open end 42F at the front side of the contracted flow path 42 opens forward and downward, beneath the downwardly-directed opening portion 24L of the floor tunnel 24. On the other hand, an open end 42R at the rear side of the contracted flow path 42 opens substantially directly toward the rear.

Moreover, as shown in FIG. 3 and FIG. 4, the rear portion of the contracted flow path 42 is divided into plural flow paths by partitioning walls 46 that stand erect so as to connect the sub-muffler 22S and the heat insulator 38. Further, the positions of the vehicle transverse direction end portions of the sub-muffler 22S and the heat insulator 38 substantially coincide, and the vehicle transverse direction end portions at the same sides are connected by standing walls 48. Accordingly, the contracted flow path 42 is closed in the vehicle transverse direction by the pair of standing walls 48, and is made into flow paths that are divided plurally in the vehicle transverse direction by the partitioning walls 46.

At the above-described contracted flow path 42, when traveling wind is introduced-in from the open end 42F accompanying the traveling of the vehicle V, the flow velocity of the traveling wind is increased due to the throttling shape of the contracted flow path 42, and the traveling wind is made to flow-out from the open end 42R. This traveling wind is further discharged-out to beneath the floor from the portion, that is further rearward than the sub-muffler 22S, at the downwardly-directed opening portion 24L of the floor tunnel 24. Due to the above, at the vehicle front portion structure 10, in a vicinity of the open end 42R of the contracted flow path 42, negative pressure is generated and airflow that passes through the cooling unit 30 is promoted.

Therefore, at the vehicle front portion structure 10, the contracted flow path 42, that is formed by the sub-muffler 22S, the heat insulator 38, the lower plate 44, the partitioning walls 46 and the standing walls 48, is the main portion of the airflow promoting structure 40.

(Operation)

Operation of the embodiment is described next.

In the vehicle V to which the vehicle front portion structure 10 having the above-described structure is applied, at the time of traveling thereof, cooling water circulates between the power unit 12 and the radiator portion of the cooling unit 30.

This cooling water is cooled by heat exchange with air at the cooling unit 30. Further, at the time of operating the air conditioner, coolant circulates in the order of the condenser portion, an expansion valve, an evaporator, and a compressor of the cooling unit 30, and a refrigeration cycle is formed. The cooling unit 30 functions as a condenser that cools and condenses the coolant by heat exchange with air.

This heat exchange at the cooling unit 30 is carried out by traveling wind of the vehicle V, or airflow that is generated by operation of the fan unit 32, i.e., forced cooling wind, flowing through the air-side flow path of the cooling unit 30. For example, when it is judged by an unillustrated cooling ECU that the vehicle speed of the vehicle is less than or equal to a predetermined vehicle speed and the cooling water temperature is greater than or equal to a predetermined temperature, the fan unit 32 is operated by this cooling ECU. Thereupon, due to the suction force of the fan unit 32, air beneath the floor passes through the air intake port 36 and is led to the cooling unit 30 as forced cooling wind.

In this case, due to the negative pressure that is generated by the forced cooling wind, airflow that flows through the contracted flow path 42 from the front toward the rear is generated or promoted. Namely, in the state in which the vehicle speed is low and the amount of the traveling wind is small, a flow of the forced cooling wind through the contracted flow path 42 is promoted by the airflow that is made to flow-out from the downwardly-directed opening portion 24L of the floor tunnel 24 at the rear of the open end 42R. Due thereto, the exhaust within the sub-muffler 22S is cooled.

Then, when it is judged by the cooling ECU that the vehicle speed of the vehicle V has exceeded a predetermined vehicle speed, the fan unit 32 is stopped by this cooling ECU. Here, in a comparative example that is not provided with the airflow promoting structure 40, i.e., the contracted flow path 42, the blades of the fan 32F in the stopped state at the fan unit 32 are resistance to the passage of the traveling wind that passes-through the cooling unit 30. Therefore, in the present comparative example, it is difficult to ensure the amount of cooling wind that is needed for the heat exchange at the cooling unit 30. Accordingly, in the structure of the comparative example, the volume and the placement of the cooling unit 30 are relied upon in order to obtain the needed cooling performance.

In contrast, in the present embodiment, when the vehicle speed of the vehicle V exceeds a predetermined vehicle speed, traveling wind flows into the contracted flow path 42 from the open end 42F, and, due to the throttling (choking) effect of the contracted flow path 42, the speed of this traveling wind is increased, and the traveling wind is made to flow-out from the open end 42R (refer to arrow F1 of FIG. 1). Moreover, at the rear of the sub-muffler 22S, this traveling wind is discharged-out to the exterior of the vehicle from the downwardly-directed opening portion 24L of the floor tunnel 24 (refer to arrow F2 of FIG. 1). Due thereto, negative pressure is generated at the periphery of the open end 42R within the exhaust duct 24D of the floor tunnel 24, i.e., at the rear of the cooling unit 30. Flow of air, that passes through the cooling unit 30 from the front side toward the rear side (refer to arrow F3 of FIG. 1), is promoted due to air being drawn by this negative pressure (due to the choking effect).

Due to the above, at the vehicle front portion structure 10, even when the fan unit 32 is stopped, the needed amount of cooling wind is ensured. Accordingly, at the vehicle front portion structure 10, as compared with the above-described comparative example for example, the cooling unit 30 is made to be compact, or, if the same size, can be applied to a large engine or air conditioner. Namely, the needed cooling performance can be ensured by the cooling unit 30 that is disposed within the floor tunnel 24. On the other hand, when the fan unit 32 is stopped because the vehicle speed of the vehicle V is less than or equal to a predetermined vehicle speed and the cooling water temperature is less than a predetermined temperature, traveling wind is made to flow-out to the exhaust duct 24D while passing through the contracted flow path 42 and the speed thereof being increased. In this case as well, air is drawn by the negative pressure within the exhaust duct 24D, and a flow of the air, that passes through the cooling unit 30 from the front side toward the rear side, is promoted. In this case, as compared with a case of traveling at high speed, the effect is small because the amount of traveling wind is small. However, because the cooling water temperature is low, a sufficient cooling performance is ensured with respect to the weak cooling demand.

Further, in the vehicle front portion structure 10, the exhaust that passes through the interior of the sub-muffler 22 is cooled by the traveling wind that passes-through the contracted flow path 42. On the other hand, when the fan unit 32 operates, as described above, airflow that passes through the contracted flow path 42 is generated or promoted by the forced cooling wind that is generated by operation of the fan unit 32. Due thereto, even at times when the vehicle V is traveling at a low speed or at times when the vehicle V is stopped, the effect of cooling the exhaust within the sub-muffler 22S is obtained. In particular, the sub-muffler 22S, at which the flow velocity of the exhaust is low at a structural part at the front portion of the exhaust system 16, is a structure that contacts fresh traveling wind at the wide upper surface (flat surface) thereof, and therefore, the efficiency of cooling the exhaust is high.

Due to the above, in the vehicle front portion structure 10 of the present embodiment, rendering an insulator unnecessary at the exhaust system 16, that is further toward the rear (the downstream side) than the sub-muffler 22S, is realized. Namely, as compared with a comparative example in which the airflow promoting structure 40 is structured without using a structural part of the exhaust system 16, compactness of the heat insulator 38 is devised. Note that maintaining of the high temperature of the exhaust system 16 is required up to the catalytic converter 20. However, because the exhaust is cooled at the sub-muffler 22S that is further toward the downstream side than the catalytic converter 20, the needed exhaust performance is maintained. If anything, the volume (pressure) of the exhaust is reduced due to cooling, which contributes to promoting exhausting.

Moreover, at the vehicle front portion structure 10, the sub-muffler 22S and the heat insulator 38 cover the cooling unit 30 and the fan unit 32 from the side of the downwardly-directed opening portion 24L of the floor tunnel 24. Therefore, entry of foreign matter, such as mud or stones or debris or the like, into the interiors of the cooling unit 30 and the fan unit 32 is suppressed. In particular, at the time of backing-up (reversing) of the vehicle V, it is easy for foreign matter to enter into the fan 32F of the fan unit 32. However, because the sub-muffler 22S and a portion of the heat insulator 38 are disposed at the lower rear of the fan 32F, entry of this foreign matter is suppressed effectively.

Note that, in the above-described embodiment, an example is illustrated in which the airflow promoting structure 40 (the contracted flow path 42), that promotes the airflow that passes through the cooling unit 30 at the time the fan unit 32 is stopped, is structured by the sub-muffler 22S and the heat insulator 38. However, the present invention is not limited to this. For example, a contracted flow path that achieves the above-described function may be formed by a part used exclusively therefor, or the contracted flow path 42 may be formed by a heat insulator and a structural part of the exhaust system 16 other than the sub-muffler 22S (e.g., the exhaust pipe 18). Further, an exhaust heat recovery apparatus (a heat exchanger), that recovers exhaust heat by engine cooling water or the like, may be used as the exhaust system part that is disposed within the floor tunnel 24 and structures at least a portion of the airflow promoting structure 40. Moreover, the airflow promoting structure may be structured by utilizing a cross member that connects a pair of skeleton members that extend longitudinally at both sides of the tunnel, or the like.

Further, the above-described embodiment illustrates an example in which the cooling unit 30 is structured to include a radiator and a condenser for air conditioning, but the present invention is not limited to this, and the cooling unit 30 may be structured to have only one of either of a radiator and a condenser for air conditioning. In a structure in which the power unit 12 includes the engine 12E that is an internal combustion engine, it is preferable that there be a structure in which the cooling unit 30 includes a radiator and the contracted flow path 42 is formed by utilizing the exhaust system 16.

Moreover, although the above-described embodiment illustrates an example in which the power unit 12 is disposed in the power unit chamber 14 that is positioned at the front of the vehicle cabin C (a general engine vehicle such as an FF vehicle, an FR vehicle, a 4WD vehicle, or the like), the present invention is not limited to this. For example, in a structure in which the power unit 12 that includes the engine 12E is disposed in a power unit chamber that is positioned at the rear of the vehicle cabin C, the cooling unit 30 and the like may be set in the arrangement of the above-described embodiment. Further, the power unit 12 may be structured so as to not include the engine 12E.

Still further, although the above-described embodiment illustrates an example in which the cooling wind to the cooling unit 30 is made to flow-in from beneath the floor through the air intake port 36, the present invention is not limited to this. For example, there may be a structure in which, instead of or in addition to the cooling wind from the air intake port 36, cooling wind, that is made to flow-in from an air intake port formed in a front bumper cover 50 (see FIG. 2, FIG. 3), is led to the cooling unit 30 along the longitudinal direction.

Further, the above-described embodiment illustrates an example in which the fan unit 32 that is the forced cooling wind means is provided at the rear of the cooling unit 30, but the present invention is not limited to this. For example, there may be a structure that is not provided with a forced cooling wind generating means, or there may be a structure that is provided with a forced cooling wind generating means of a type that is different than the fan 32F that is an axial fan, or there may be a structure that is provided with a forced cooling wind generating means that is disposed at a region other than at the rear of the cooling unit 30, such as at the front of the cooling unit 30 or the like. By providing the airflow promoting structure of the present invention, the effect of promoting cooling wind passing through the cooling unit 30 is obtained regardless of the existence of a forced cooling wind generating means.

Moreover, although the above-described embodiment illustrates an example in which the cooling unit 30 is disposed at a forwardly-inclined posture, the present invention is not limited to this. For example, the cooling unit 30 may be set in an erect posture so as to run along the vertical direction as seen in side view.

In addition, it goes without saying that the present invention is not limited to the structure of the above-described embodiment, and can be implemented by being modified in various ways within a scope that does not deviate from the gist thereof.

The invention claimed is:
1. A vehicle front portion structure comprising:
a heat exchanger that is disposed at a vehicle rear side with respect to a power unit, and into which airflow is introduced through an air intake port beneath a vehicle floor;
a flow path member that forms a discharging flow path that discharges airflow, that has passed through an air-side flow path of the heat exchanger, to a vehicle exterior from an opening portion that is directed toward a vehicle lower side at the vehicle rear side with respect to the heat exchanger; and
an airflow promoting structure that is disposed between the heat exchanger and the opening portion, and at a vehicle lower side of the discharging flow path, a traveling wind flowing-out without passing through the air-side flow path of the heat exchanger and that forms a contracted flow path that gradually becomes more narrow from a front end side toward a rear end side, and that, at the front end side, increases a speed of traveling wind that has flowed-in from beneath the vehicle floor, and that causes the traveling wind to flow-out from between the heat exchanger and the opening portion at the discharging flow path.
2. The vehicle front portion structure of claim 1, wherein the airflow promoting structure is structured by members including
an exhaust system part that is disposed at a vehicle front side with respect to the opening portion of the discharging flow path, and
a heat-insulating member that covers at least a portion of the exhaust system part from the vehicle front side and from above such that at least a portion of the contracted flow path is formed.
3. The vehicle front portion structure of claim 2, wherein the exhaust system part is structured to include a muffler that is disposed so as to be long in a vehicle transverse direction and that is flat in a vehicle vertical direction.
4. The vehicle front portion structure of claim 1, comprising a fan that is provided at the vehicle rear side with respect to the heat exchanger within the discharging flow path and at a vehicle front side with respect to a portion where the contracted flow path portion causes air to flow-out, and, due to an operation of the fan, airflow that passes through the heat exchanger is generated, and the operation of the fan is prohibited when a vehicle speed exceeds a predetermined value.

* * * * *